United States Patent
Inoue (10) Patent No.: US 7,589,802 B2
(45) Date of Patent: Sep. 15, 2009

(54) LIQUID CRYSTAL DISPLAY DEVICE, METHOD OF MANUFACTURING LIQUID CRYSTAL DISPLAY DEVICE AND METHOD OF DESIGNING LIQUID CRYSTAL DISPLAY DEVICE

(75) Inventor: Kaoru Inoue, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 328 days.

(21) Appl. No.: 11/464,962

(22) Filed: Aug. 16, 2006

(65) Prior Publication Data
US 2007/0046858 A1    Mar. 1, 2007

(30) Foreign Application Priority Data
Aug. 31, 2005  (JP) .............................. 2005-251450

(51) Int. Cl.
*G02F 1/1335* (2006.01)
(52) U.S. Cl. .......................................... 349/65; 349/96
(58) Field of Classification Search ................... 349/65

See application file for complete search history.

(56) References Cited

U.S. PATENT DOCUMENTS
2003/0063234 A1*  4/2003  Oda et al. ..................... 349/65

FOREIGN PATENT DOCUMENTS
JP    2001-166302    6/2001
JP    2005-85467     3/2005

* cited by examiner

*Primary Examiner*—Richard H Kim
(74) *Attorney, Agent, or Firm*—Oblon, Spivak, McClelland, Maier & Neustadt, L.L.P.

(57) ABSTRACT

A liquid crystal display device includes an area light source unit which is opposed to one of polarizer. The area light source unit includes a light guide having a light incidence surface opposed to a cold cathode tube, a light emission surface which emits light that is incident on the light incidence surface, and an opposed surface which is opposed to the light emission surface, and a prismatic sheet disposed between the polarizer plate and the light guide. The light guide has prisms on at least the opposed surface. The prismatic sheet has prisms which extend in a direction that is displaced counterclockwise by a first predetermined angle from a direction that is perpendicular to a direction of extension of the prisms. An angle between a polarization axis of the polarizer plate and a polarization axis of the prismatic sheet is set at a second predetermined angle.

5 Claims, 6 Drawing Sheets

FIG. 6

LIQUID CRYSTAL DISPLAY DEVICE, METHOD OF MANUFACTURING LIQUID CRYSTAL DISPLAY DEVICE AND METHOD OF DESIGNING LIQUID CRYSTAL DISPLAY DEVICE

CROSS-REFERENCE TO RELATED APPLICATIONS

This application is based upon and claims the benefit of priority from prior Japanese Patent Application No. 2005-251450, filed Aug. 31, 2005, the entire contents of which are incorporated herein by reference.

BACKGROUND OF THE INVENTION

1. Field of the Invention

The present invention relates generally to a liquid crystal display device, a manufacturing method thereof, and a design method thereof, and more particularly to a liquid crystal display device including a prismatic light guide and a prismatic sheet.

2. Description of the Related Art

A liquid crystal display device includes a liquid crystal display panel. The liquid crystal display panel includes a pair of opposed substrates, that is, an array substrate and a counter-substrate, and a liquid crystal layer which is held between the pair of substrates. A polarizer plate is disposed on an outer surface of each of the array substrate and counter-substrate.

A transmissive liquid crystal display device further includes an area light source unit which is disposed to be opposed to the array substrate-side polarizer plate. The area light source unit includes a light source, and a light guide having a light incidence surface which is opposed to the light source, a light emission surface which is opposed to the array substrate-side polarizer plate, and an opposed surface which is opposed to the light emission surface. In recent years, with a view to improving the efficiency of use of light from a light source, an area light source unit has been put to practical use, which includes a prismatic light guide having prisms formed on at least one of a light emission surface and an opposed surface thereof, and a prismatic sheet disposed on the light emission surface of the light guide.

In the case where the prismatic sheet is formed of a sheet which is fabricated by drawing a plate-shaped polyethylene terephthalate (PET) base material in its planar direction, the prismatic sheet has such characteristics that the prismatic sheet polarizes light that is emitted from the light guide.

In the prior art, there has been proposed a liquid crystal display device wherein a prismatic sheet is selectively used in consideration of the fact that the characteristics of the prismatic sheet vary depending on the position where the prismatic sheet is diced from the PET sheet, and a direction, in which light emitted from the light guide takes a maximum intensity value, is rotated by the prismatic sheet toward a polarization axis of the polarizer plate that is disposed on the outer surface of the array substrate (see Jpn. Pat. Appln. KOKAI Publication No. 2001-166302).

In the method disclosed in the above-mentioned Jpn. Pat. Appln. KOKAI Publication No. 2001-166302, however, the prismatic sheet is disposed such that the prisms of the prismatic sheet are substantially perpendicular to the prisms of the light guide, and the light emitted from the area light source unit interferes with the pattern of the liquid crystal display panel, leading to occurrence of an interference fringe on a display screen.

BRIEF SUMMARY OF THE INVENTION

The present invention has been made in consideration of the above-described problem, and the object of the invention is to provide a liquid crystal display device which is capable of preventing occurrence of an interference fringe on a display screen and suppressing a decrease in luminance, a method of manufacturing the liquid crystal display device and a method of designing the liquid crystal display device.

According to a first aspect of the present invention, there is provided a liquid crystal display device comprising: a liquid crystal display panel in which a liquid crystal layer is held between a pair of mutually opposed substrates; polarizer plates which are disposed on outer surfaces of the pair of substrates; and an area light source unit which is opposed to one of the polarizer plates, wherein the area light source unit includes: a light source; a light guide having a light incidence surface which is opposed to the light source, a light emission surface which emits light that is incident on the light incidence surface, and an opposed surface which is opposed to the light emission surface; and a prismatic sheet which is disposed between the one of the polarizer plates and the light guide, the light guide has prisms on at least one of the light emission surface and the opposed surface, the prismatic sheet has prisms which extend in a direction that is displaced counterclockwise by a first predetermined angle (between 4° and 8°) from a direction that is perpendicular to a direction of extension of the prisms of the light guide, and an angle between a polarization axis of the one of the polarizer plates and a polarization axis of the prismatic sheet is set at a second predetermined angle (between 0° and 20°)

According to a second aspect of the present invention, there is provided a method of manufacturing a liquid crystal display device, comprising: a step of forming a liquid crystal display panel by injecting a liquid crystal composition between a pair of substrates; a step of fixing polarizer plates on outer surfaces of the pair of substrates; a step of forming an area light source unit which is opposed to one of the polarizer plates; and a step of combining the liquid crystal display panel and the area light source unit, wherein the step of forming the area light source unit includes: a step of forming a mother light guide which has prisms on at least one of major surfaces thereof; a step of drawing a plate-shaped member and forming prisms on one of surfaces of the plate-shaped member, thus forming a sheet-shaped member; a step of stacking the mother light guide and the sheet-shaped member such that the prisms of the sheet-shaped member extend in a direction that is displaced counterclockwise by a first predetermined angle (between 4° and 8°) from a direction that is perpendicular to a direction of extension of the prisms of the mother light guide; and a step of dicing the mother light guide and the sheet-shaped member, and the step of combining the liquid crystal display panel and the area light source unit includes a step of combining the liquid crystal display panel and the area light source unit such that an angle between a polarization axis of the sheet-shaped member and a polarization axis of the polarizer plate, which is located on the area light source unit side, is set at a second predetermined angle (between 0° and 20°).

According to a third aspect of the present invention, there is provided a method of designing a liquid crystal display device, comprising: disposing a prismatic sheet on a light guide having prisms, such that prisms provided on the prismatic sheet extend in a direction substantially perpendicular to a direction of extension of the prisms of the light guide; disposing a liquid crystal display panel, which has a display section, on the prismatic sheet; rotating the liquid crystal display panel in a plane substantially parallel to the prismatic sheet, and measuring a luminance of the display section of the liquid crystal display panel; determining a rotational direction of the liquid crystal display panel, in which the luminance of the display section increases, on the basis of a measurement result of the luminance; and setting a rotational direction of the prismatic sheet to be opposite to the rotational direction of the liquid crystal display panel.

The present invention can provide a liquid crystal display device which is capable of preventing occurrence of an interference fringe on a display screen and suppressing a decrease in luminance, a method of manufacturing the liquid crystal display device and a method of designing the liquid crystal display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device according to the present invention, a manufacturing method thereof and a designing method thereof will now be described with reference to the accompanying drawings.

Figure 1:
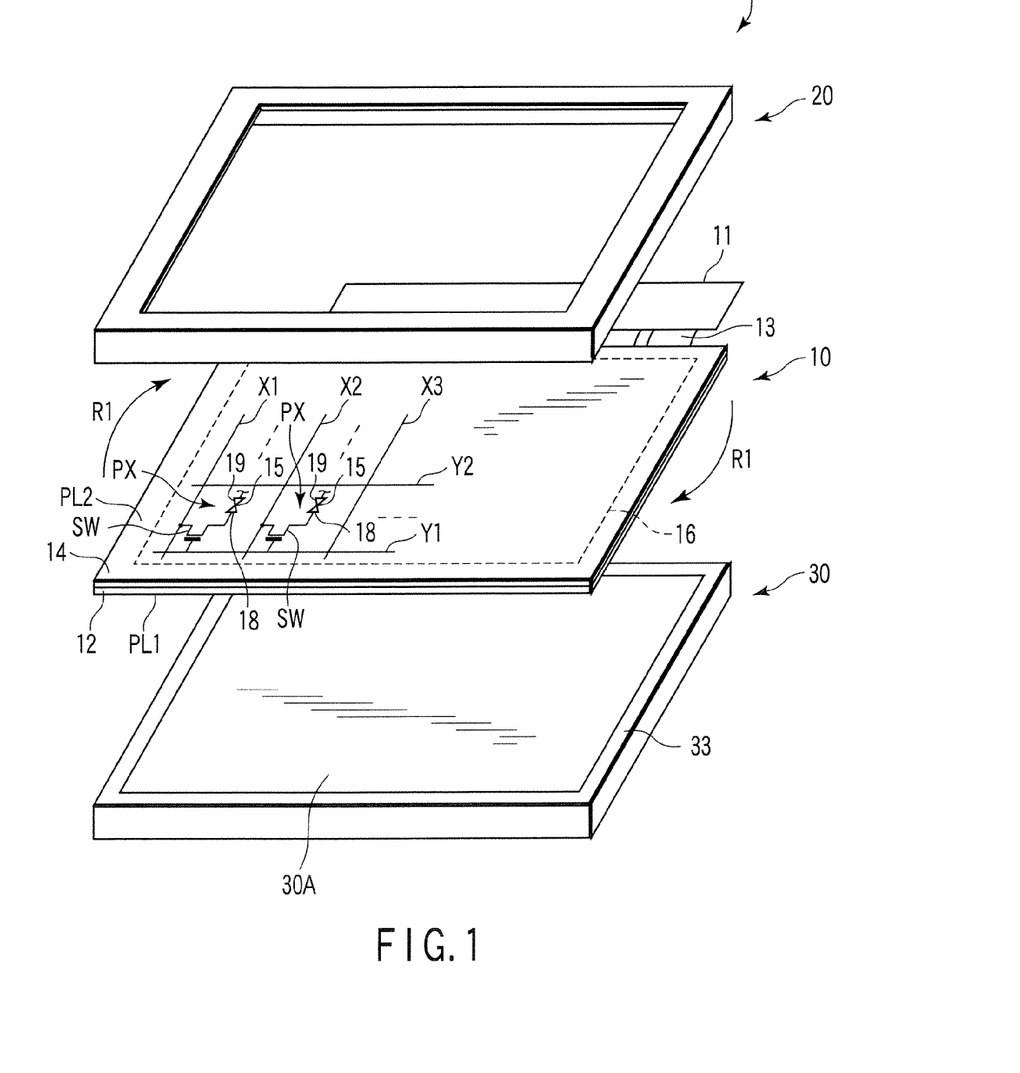
FIG. 1 schematically shows a liquid crystal display device according to an embodiment of the present invention.

As is shown in FIG. 1, a liquid crystal display device 1 includes a substantially rectangular liquid crystal display panel 10, an area light source unit 30 which illuminates the liquid crystal display panel 10 from the back side, and a bezel cover 20 which holds a peripheral edge part of the liquid crystal display device. The area light source unit 30 is disposed to be opposed to the back side of the liquid crystal display panel 10. The rectangular frame-shaped bezel cover 20 is attached to the front surface side of the liquid crystal display panel 10.

The liquid crystal display panel 10 is composed of a pair of opposed substrates, that is, an array substrate 12 and a counter-substrate 14, and a liquid crystal layer 15 which is held between the pair of substrates as an optical modulation layer. The liquid crystal display panel 10 includes a substantially rectangular display section 16 which displays an image. The display section 16 is composed of a plurality of matrix-arrayed display pixels PX. Polarizer plates PL1 and PL2 are disposed on outer surfaces of the array substrate 12 and counter-substrate 14.

In the display section 16, the array substrate 12 includes wiring lines, for example, a plurality of scan lines Y (1, 2, 3, . . . , m) which extend in a row direction (direction D1) of the display pixels PX, and a plurality of signal lines X (1, 2, 3, . . . , n) which extend in a column direction (direction D3) of the display pixels PX. In addition to the wiring lines, the array substrate 12 includes switching elements SW which are disposed near intersections between the scan lines Y and signal lines X in association with the respective display pixels PX, and pixel electrodes 18 connected to the switching elements SW.

The switching element SW is composed of, e.g. a thin-film transistor (TFT). The gate electrode of the switching element SW is electrically connected to the associated scan line Y (or formed integral with the scan line). The source electrode of the switching element SW is electrically connected to the associated signal line X (or formed integral with the signal line). The drain electrode of the switching element SW is electrically connected to the pixel electrode 18 of the associated display pixel PX.

The counter-substrate 14 includes a counter-electrode 19 which is common to all the display pixels PX. The counter-electrode 19 is formed of a light-transmissive, electrically conductive material such as indium tin oxide (ITO).

A driver circuit board 11 having an elongated rectangular plate shape, which supplies driving signals to the liquid crystal display panel 10, is electrically connected to one side edge portion of the liquid crystal display panel 10 via a flexible printed wiring board 13 having an elongated rectangular plate shape. The driver circuit board 11 is disposed on the back surface of the area light source unit 30 by bending the printed wiring board 13 toward the back side of the area light source unit 30. In this case, an elongated rectangular insulating sheet (not shown) is interposed between the driver circuit board 11 and area light source unit 30, and this insulating sheet secures insulation between the driver circuit board 11 and area light source unit 30.

Figure 2:
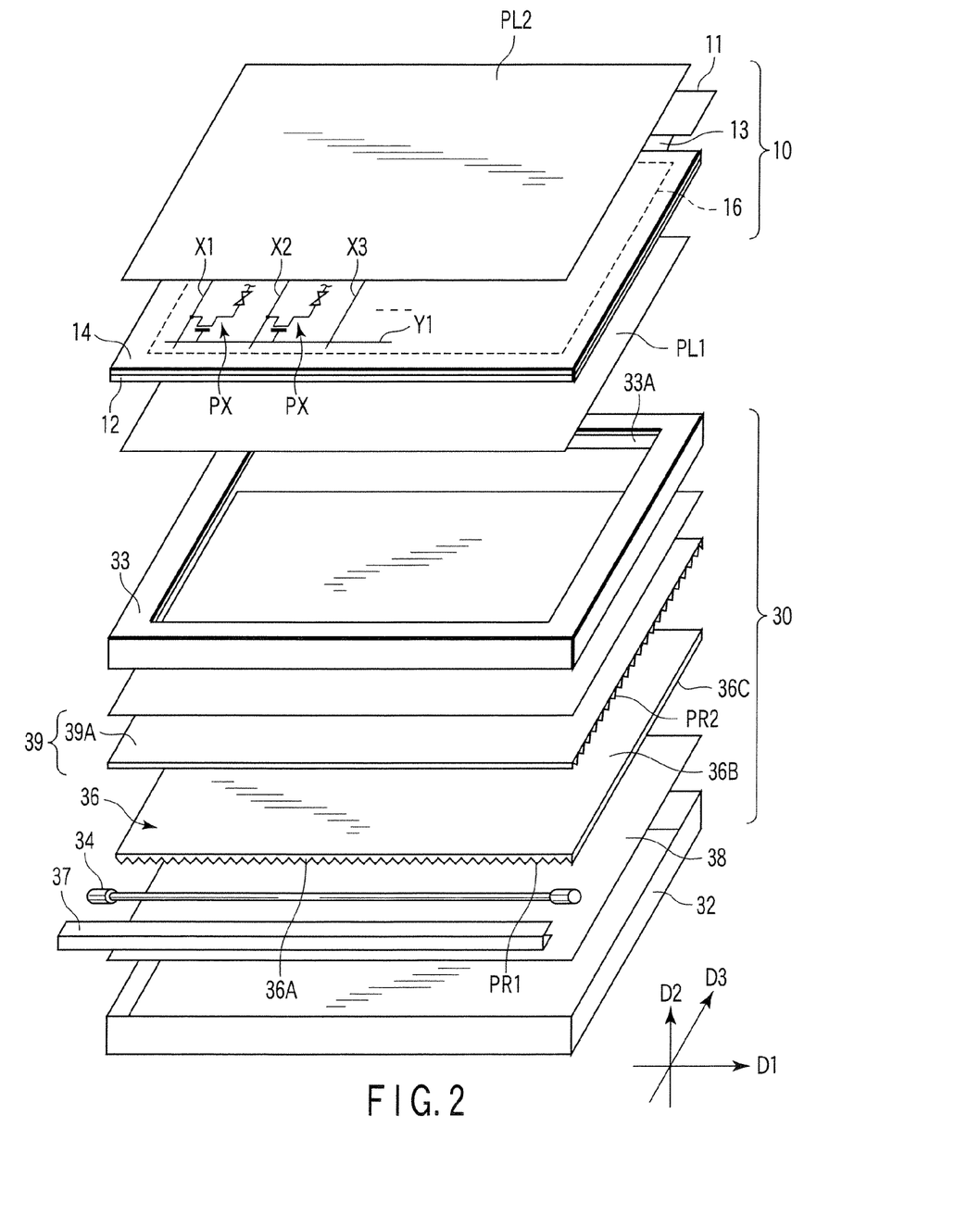
FIG. 2 is an exploded perspective view for describing an example of the structures of a liquid crystal display panel and an area light source unit shown in FIG. 1.

The area light source unit 30 has a light emission surface 30A which faces the array substrate 12 of the liquid crystal display panel 10. As is shown in FIG. 2, the area light source unit 30 includes a rectangular light guide 36. The light guide 36 has a light incidence surface 36A on which light is incident, a light emission surface 36B from which the incident light that is incident on the light incidence surface 36A is emitted, and an opposed surface 36C which is opposed to the light emission surface 36B. The light guide 36 is a prismatic light guide having prisms on one of the light emission surface 36B and opposed surface 36C. In this embodiment, the opposed surface 36C has a plurality of prisms PR1.

A cold cathode tube 34 functioning as a light source is disposed to be opposed to the light incidence surface 36A of the light guide 36, and the cold cathode tube 34 extends in direction D1. A reflector 37 functioning as a light reflecting member is disposed so as to surround the cold cathode tube 34.

A reflection sheet 38 serving as an optical sheet is disposed on the opposed surface 36C side of the light guide 36. The reflection sheet 38 reflects light, which leaks out of the light guide 36 through the opposed surface 36C, toward the light emission surface 36B of the light guide 36. A plurality of optical sheets 39 are disposed on the light emission surface 36B side of the light guide 36.

The optical sheets 39 impart predetermined optical characteristics to the light that emerges from the light emission surface 36B of the light guide 36. For example, the optical sheets 39 include a prismatic sheet 39A having prisms, and a diffusion sheet which diffuses emission light from the light emission surface 36B. The prismatic sheet 39A is formed of, e.g., a PET base material. In this embodiment, the prismatic sheet 39A has a plurality of prisms PR2 on a surface thereof which is opposed to the light guide 36.

The liquid crystal display panel 10 and area light source unit 30 are supported by a back frame 32. Peripheral parts of the light guide 36, reflection sheet 38 and optical sheets 39 are held by a front frame 33 which is attached to the back frame 32. The front frame 33 has a window portion 33A which exposes the light emission surface 30A of the area light source unit 30.

In the liquid crystal display device 1, if the prisms of the light guide 36 and the prisms of the prismatic sheet 39A extend in substantially perpendicular directions, the luminance of the display screen increases but an interference fringe occurs on the display screen. Thus, the prismatic sheet 39A is rotated to dispose the prisms of the light guide 36 and the prisms of the prismatic sheet 39A in such a positional relationship that the prisms of the light guide 36 are not perpendicular to the prisms of the prismatic sheet 39A. Thereby, the occurrence of an interference fringe on the display screen is prevented. A description will now be given of a method of determining the rotational direction of the prismatic sheet 39A in this case, and designing the liquid crystal display device 1.

To start with, the light guide 36 and prismatic sheet 39A are disposed such that the prisms of the prismatic sheet 39A are perpendicular to the prisms of the light guide 36. The liquid crystal display panel 10 is disposed such that the polarizer plate PL1 is opposed to the prismatic sheet 39A. The luminance of the display screen is measured by rotating the liquid crystal display panel 10 clockwise (rotational direction R1 in FIG. 1) in a plane parallel to the prismatic sheet 39A.

Figure 3:
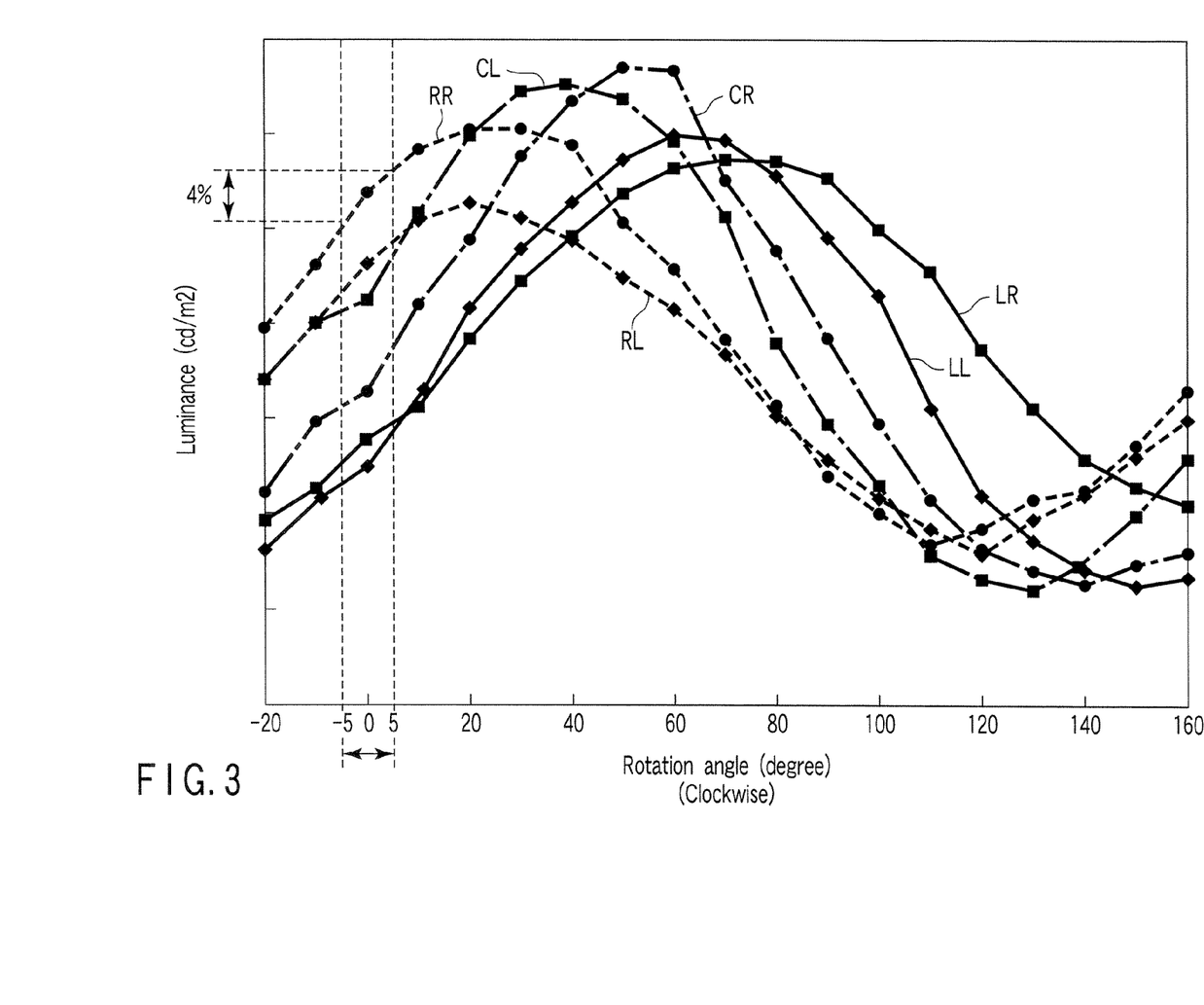
FIG. 3 is a graph showing an example of a measurement result which is obtained by measuring the luminance of a display screen by rotating clockwise the liquid crystal display panel of the liquid crystal display device shown in FIG. 1.
Figure 5:
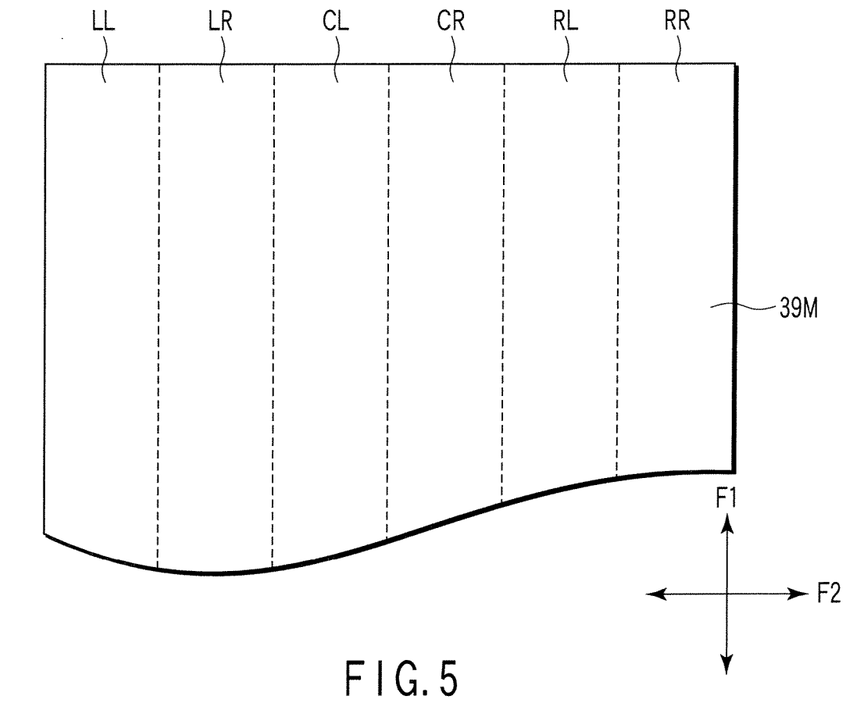
FIG. 5 is a view for describing positions of dicing of prismatic sheets from a sheet material, which are used for six kinds of measurements as shown in FIG. 3.

As will be described later, the prismatic sheet 39A is formed by cutting out a part of a PET sheet 39M which is formed by drawing a plate-shaped PET base material in its planar directions F1 and F2. In this embodiment, six prismatic sheets 39A, which are cut out of six regions LL, LR, CL, CR, RL and RR of the PET sheet 39M shown in FIG. 5, respectively, were prepared. Using these six prismatic sheets 39A, six measuring operations were conducted. FIG. 3 shows results of measurement of the luminance of the display screen.

In the measurement, it is assumed that the rotational angle is 0° when the liquid crystal display panel 10 and area light source unit 30 are so disposed that the direction of extension of the signal lines X is parallel to the direction of extension of the prisms on the light guide 36.

As is shown in FIG. 3, for example, when the liquid crystal display panel 10 is rotated clockwise by 5°, the luminance becomes higher than when the liquid crystal display panel 10 is rotated clockwise by −5°. This tendency was observed with respect to all the six prismatic sheets 39A which were diced out of the six regions LL, LR, CL, CR, RL and RR shown in FIG. 5.

Specifically, when the liquid crystal display panel 10 is to be rotated clockwise, the liquid crystal display panel 10 is rotated in such a direction that an acute angle between a polarization axis AX1 of the polarizer plate PL1 and a polarization axis AX2 of the prismatic sheet 39A may become smaller with respect to each of the six prismatic sheets 39A.

The polarization axis AX2 of the prismatic sheet 39A, in this context, is an axis which agrees with the transmission axis of the polarizer plate PL1 when the polarizer plate PL2 is rotated, and the light emerging from the polarizer plate PL1 takes a maximum value in the direction of the polarization axis AX2.

Accordingly, in order to prevent an interference fringe from occurring on the display screen, the rotational direction of the prismatic sheet 39A may be set to be a counterclockwise direction when the liquid crystal display panel 10 and light guide 36 are fixed. To be more specific, based on the measurement result shown in FIG. 3, it was confirmed, with respect to each of the six prismatic sheets 39A diced out of the six regions LL, LR, CL, CR, RL and RR shown in FIG. 5, that the luminance becomes higher when the prismatic sheet 39A is rotated counterclockwise than when the prismatic sheet 39A is rotated clockwise.

In the present embodiment, when the prismatic sheet 39A cut of the region RR was used, the luminance of the display screen was higher when the liquid crystal display panel 10 was rotated clockwise by 5° than when the liquid crystal display panel 10 was rotated clockwise by −5° (i.e. rotated counterclockwise by 5°), and the difference in luminance was about 4%.

In order to prevent the occurrence of an interference fringe on the display screen, it is desirable to rotate the prismatic sheet 39A counterclockwise by 4° or more (that is, it is desirable that the acute angle between the prisms PR2 of the prismatic sheet 39A and the prisms PR1 of the light guide 36 be 86° or less). However, if the acute angle between the prisms PR2 of the prismatic sheet 39A and the prisms PR1 of the light guide 36 is too small, the effect of these prisms (i.e., enhancement in efficiency of use of light from the cold cathode tube 34) cannot fully be exhibited. It is desirable, therefore, that the rotational angle of the prismatic sheet 39A be set at 8° or less in the counterclockwise direction (i.e., it is desirable that the acute angle between the prisms PR2 and the prisms PR1 of the light guide be set at 82° or more).

In this case, since the angle between the direction of extension of the prisms PR1 of the light guide 36 and the direction of extension of the prisms PR2 of the prismatic sheet 39A is displaced from the substantially right angle, the luminance of the light from the area light source unit 30 decreases. However, the acute angle between the polarization axis AX1 of the polarizer plate PL1 and the polarization axis AX2 of the prismatic sheet 39A decreases and the intensity of light, which is incident from the area light source unit 30 to the liquid crystal display panel 10, increases. It was thus possible to compensate for the decrease in luminance which occurred when the angle between the direction of extension of the prisms PR1 of the light guide 36 and the direction of extension of the prisms PR2 of the prismatic sheet 39A was displaced from the substantially right angle.

In order to compensate for the decrease in luminance which occurs when the angle between the direction of extension of the prisms PR1 of the light guide 36 and the direction of extension of the prisms PR2 of the prismatic sheet 39A is displaced from the substantially right angle, it is preferable that the acute angle between the polarization axis AX1 of the polarizer plate PL1 and the polarization axis AX2 of the prismatic sheet 39A be set at 20° or less. It is more preferable that the angle between the polarization axis AX1 of the polarizer plate PL1 and the polarization axis AX2 of the prismatic sheet 39A be set at 0°, that is, the polarization axis AX1 and the polarization axis AX2 be substantially parallel.

Specifically, the prismatic sheet 39A is rotated counterclockwise by 4° to 8°, and the angle between the polarization axis AX1 of the polarizer plate PL1 and the polarization axis AX2 of the prismatic sheet 39A is set between 0° and 20°. Thereby, the occurrence of an interference fringe on the display section 16 is prevented, and the decrease in luminance of the display section 16 can be suppressed.

Next, a description is given of a method of manufacturing the liquid crystal display device 1 on the basis of the above-described results. To begin with, a method of fabricating the liquid crystal display panel 10 is described. An array substrate 12 and a counter-substrate 14 are first formed.

Specifically, a transparent insulating substrate is prepared. Film formation and patterning of metal films and insulation films are repeated on the insulating substrate. Thereby, an array substrate 12 including various wiring lines, such as signal lines X and scan lines Y, switching elements SW and pixel electrodes 18 is formed. On the other hand, another transparent insulating substrate is prepared. Film formation and patterning of metal films and color resins are repeated on the insulating substrate. Thereby, a counter-substrate 14 including a counter-electrode 19 is formed.

The array substrate 12 and counter-substrate 14 are then coupled. Specifically, the array substrate 12 and counter-substrate 14 are opposed such that the pixel electrodes 18 and the counter-electrode 19 are opposed by a space into which a liquid crystal composition that becomes a liquid crystal layer 15 is to be injected. Then, the array substrate 12 and counter-substrate 14 are attached to each other by, e.g., a seal material (not shown).

After the seal material is cured, the liquid crystal composition is injected into the space between the array substrate 12 and counter-substrate 14. Polarizer plates PL1 and PL2 are fixed on the outer surfaces of the array substrate 12 and counter-substrate 14. Thus, the liquid crystal display panel 10 is fabricated.

Next, a method of fabricating the light guide 36 and prismatic sheet 39A is described. When a sheet-shaped member, which becomes the prismatic sheet 39A, is to be formed, a plate-shaped member of, e.g., PET is prepared. The plate-shaped member is drawn in two substantially mutually perpendicular directions F1 and F2 in a planar direction of the plate-shaped member, thus forming a PET sheet. Successive prisms are formed of, e.g., ultraviolet-curing resin on one of the surfaces of the PET sheet. Thus, a PET sheet 39M having the prisms is formed.

On the other hand, when a mother light guide 36M, which becomes the light guide 36, is to be formed, a mold having a recess-and-projection shape on its inner side is prepared. Using the mold, a resin is formed and thus the mother light guide 36M having prisms is formed.

The PET sheet 39M and mother light guide 36M are stacked such that the angle between the direction of extension of the prisms PR2 of the PET sheet 39M and the direction of extension of the prisms PR1 of the mother light guide 36M is set between 82° and 86°. In the stacked state, the prismatic light guide 36 and prismatic sheet 39A are simultaneously diced out of the mother light guide 36M and the PET sheet 39M. At this time, the prismatic light guide 36 and prismatic sheet 39A are cut along dicing lines L so that the light incidence surface 36A of the light guide 36 may become substantially perpendicular to the direction of extension of the prisms of the mother light guide 36M.

Subsequently, the liquid crystal display panel 10 and area light source unit 30 are disposed such that an acute angle θ between the polarization axis AX2 of the prismatic sheet 39A and the polarization axis AX1 of the polarizer plate PL1 of the liquid crystal display panel 10 is set at 20° or less, or such that the polarization axis AX1 and the polarization axis AX2 are substantially parallel.

Figure 4:
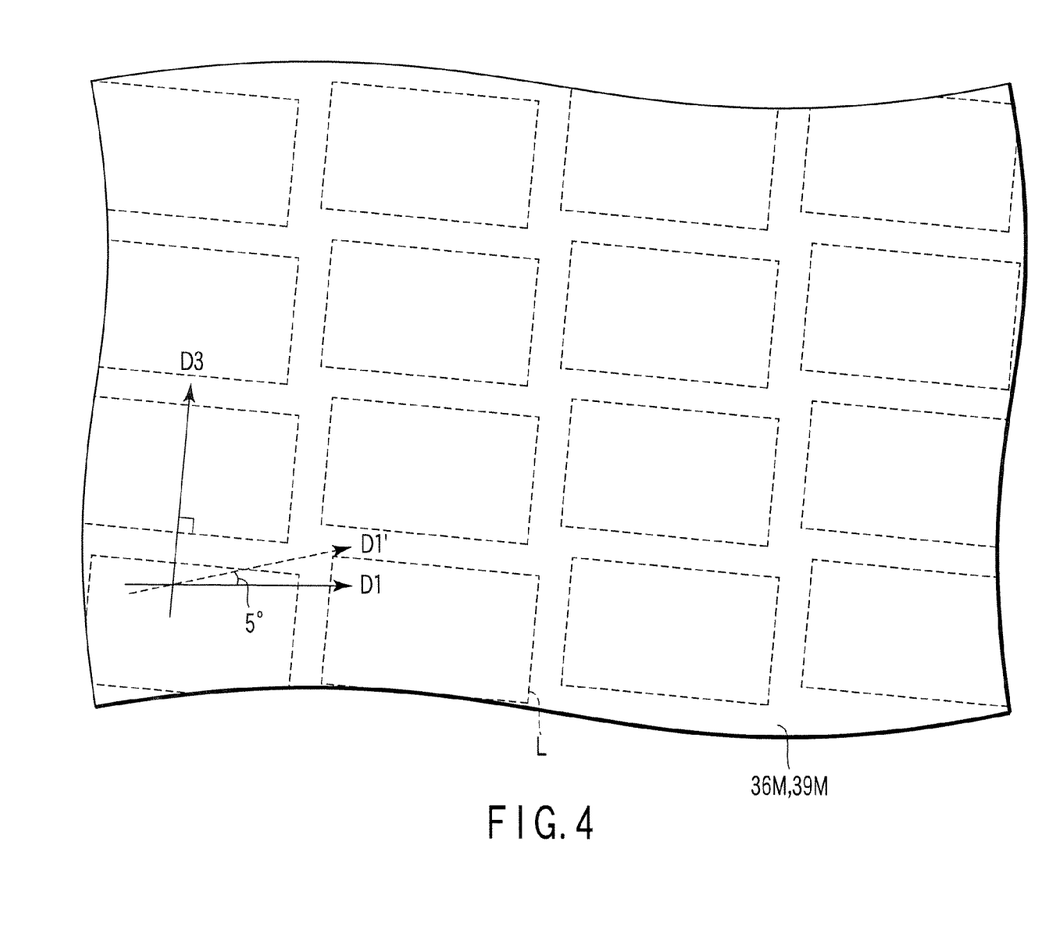
FIG. 4 is a view for explaining a method of manufacturing a light guide and a prismatic sheet of the area light source unit shown in FIG. 1.

In the present embodiment, as shown in FIG. 4, the prisms of the mother light guide 36M extend in direction D3. In this case, the PET sheet 39M is disposed such that the prisms of the PET sheet 39M extend in a direction (direction D1') which is rotated counterclockwise by 4° to 8° from direction D1 that is substantially perpendicular to direction D3. In short, the prisms of the PET sheet 39M and the prisms of the mother light guide 36M are stacked so as to form an angle of 82° to 86°.

The light guide 36 and prismatic sheet 39A are diced along the dicing lines L such that the light incidence surface 36A of the light guide 36 may become substantially perpendicular to the direction (direction D3) of extension of the prisms of the mother light guide 36M.

Figure 6:
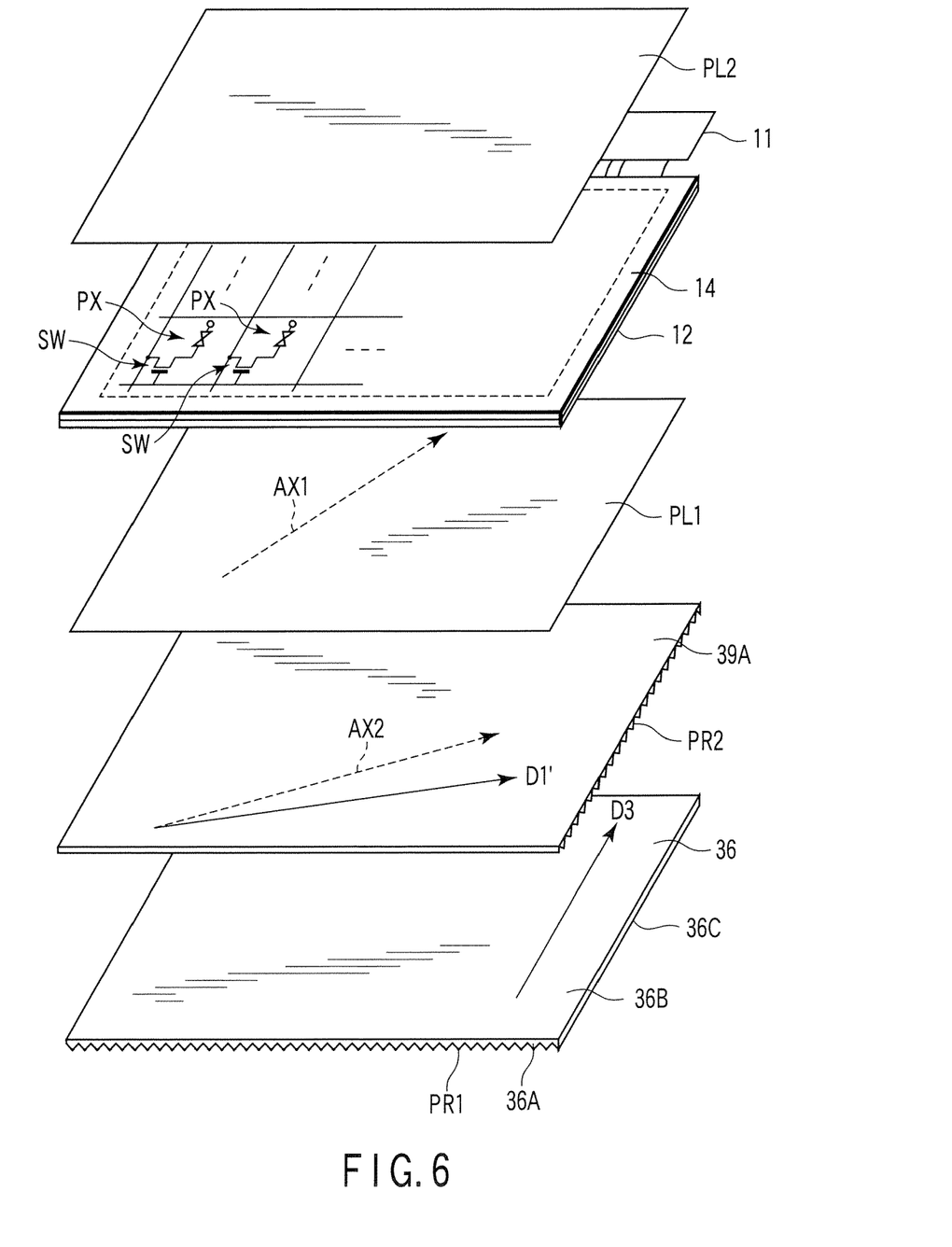
FIG. 6 is a view for explaining an example of a method of manufacturing the liquid crystal display device shown in FIG. 1.
Figure 7:
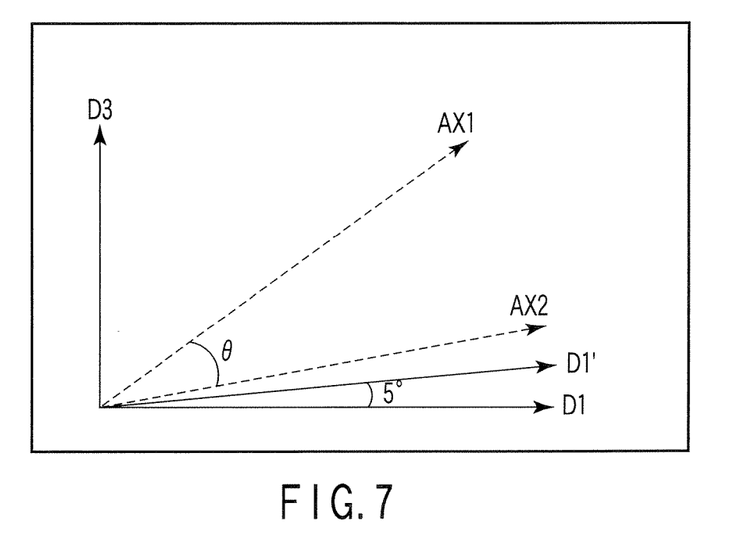
FIG. 7 is a view for explaining an example of a method of manufacturing the liquid crystal display device shown in FIG. 1.

As is shown in FIG. 6 and FIG. 7, the light guide 36 and prismatic sheet 39A are disposed such that the prisms of the light guide 36 extend in direction D3 and the prisms of the prismatic sheet 39A extend in direction D1' which is rotated counterclockwise by 5° from direction D1 that is substantially perpendicular to direction D3. In short, the prisms PR2 of the prismatic sheet 39A and the prisms PR1 of the light guide 36 extend so as to form an angle of 85°. In this case, the acute angle θ between the polarization axis AX2 of the prismatic sheet 39A and the polarization axis AX1 of the polarizer plate PL1 is set at 20° or less, or the polarization axis AX1 and the polarization axis AX2 are substantially parallel.

As has been described above, the present embodiment can provide a liquid crystal display device which is capable of preventing occurrence of an interference fringe on the display section 16 and suppressing a decrease in luminance, a method of manufacturing the liquid crystal display device and a method of designing the liquid crystal display device.

The present invention is not limited directly to the above-described embodiment. In practice, the structural elements can be modified without departing from the spirit of the invention.

In addition, various inventions can be made by properly combining the structural elements disclosed in the embodiment. For example, some structural elements may be omitted from all the structural elements disclosed in the embodiment. Furthermore, structural elements in different embodiments may properly be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
a liquid crystal display panel in which a liquid crystal layer is held between a pair of mutually opposed substrates;
polarizer plates which are disposed on outer surfaces of the pair of substrates; and
an area light source unit which is opposed to one of the polarizer plates,
wherein the area light source unit includes:
a light source;
a light guide having a light incidence surface which is opposed to the light source, a light emission surface which emits light that is incident on the light incidence surface, and an opposed surface which is opposed to the light emission surface; and a prismatic sheet which is disposed between said one of the polarizer plates and the light guide, the light guide has prisms on at least one of the light emission surface and the opposed surface, the prismatic sheet has prisms which extend in a direction that is displaced counterclockwise by a first predetermined angle from a direction that is perpendicular to a direction of extension of the prisms of the light guide, and an angle between a polarization axis of said one of the polarizer plates and a polarization axis of the prismatic sheet is set between 0° and 20°.

2. The liquid crystal display device according to claim I, wherein the first predetermined angle is set between 4° and 8°.

3. The liquid crystal display device according to claim 1, wherein the prismatic sheet is formed of a PET base material.

4. A liquid crystal display device comprising:

a liquid crystal display panel in which a liquid crystal layer is held between a pair of mutually opposed substrates;

polarizer plates which are disposed on outer surfaces of the pair of substrates; and an area light source unit which is opposed to one of the polarizer plates, wherein the area light source unit includes:

a light source;

a light guide having a light incidence surface which is opposed to the light source, a light emission surface which emits light that is incident on the light incidence surface, and an opposed surface which is opposed to the light emission surface; and a prismatic sheet which is disposed between said one of the polarizer plates and the light guide, the light guide has prisms on at least one of the light emission surface and the opposed surface, the prismatic sheet has prisms which extend in a direction that is displaced counterclockwise by a first predetermined angle between 4° and 8° from a direction that is perpendicular to a direction of extension of the prisms of the light guide, and an angle between a polarization axis of said one of the polarizer plates and a polarization axis of the prismatic sheet is set at a second predetermined angle.

5. The liquid crystal display device according to claim 4, wherein the prismatic sheet is formed of a PET base material.

* * * * *